T. W. MORGAN.
BELT CONNECTION.
APPLICATION FILED JULY 3, 1914.

1,147,037.

Patented July 20, 1915.

Witnesses:
M. L. Jennings
W. H. Brunn

Inventor,
Thomas W. Morgan, by
G. C. Kennedy
Attorney.

COLUMBIA PLANOGRAPH CO., WASHINGTON, D. C.

UNITED STATES PATENT OFFICE.

THOMAS W. MORGAN, OF WATERLOO, IOWA, ASSIGNOR TO WILBUR W. MARSH, OF WATERLOO, IOWA.

BELT CONNECTION.

1,147,037. Specification of Letters Patent. Patented July 20, 1915.

Application filed July 3, 1914. Serial No. 848,917.

*To all whom it may concern:*

Be it known that I, THOMAS W. MORGAN, a citizen of the United States of America, and a resident of Waterloo, Blackhawk county, Iowa, have invented certain new and useful Improvements in Belt Connections, of which the following is a specification.

My invention relates to improvements in belt-connections, and the object of my improvement is to provide like connecting means on the abutting ends of a divided belt adapted to secure said ends together, but capable of being readily separated by sidewise displacement when the belt is manipulated so that said connecting means are displaced perpendicularly from each other.

Figure 1:
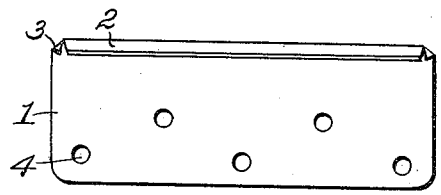
Figure 3:
Figure 2:
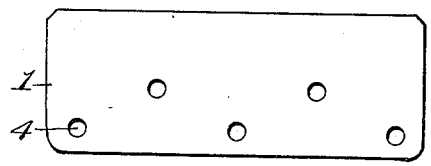
Figure 4:
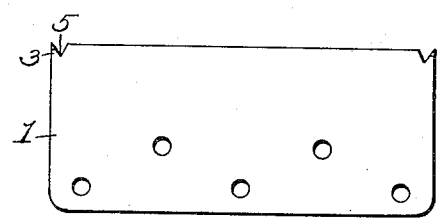
Figure 5:
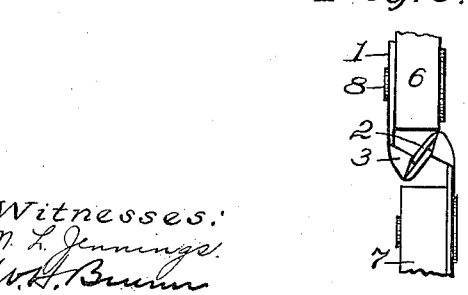
Figures 6, 7:
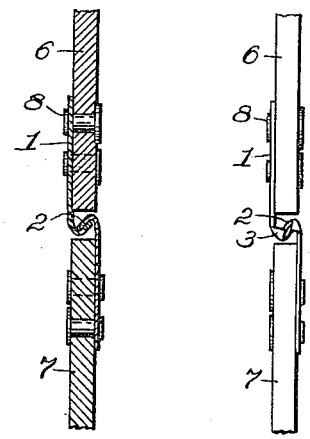
Figures 8, 9:
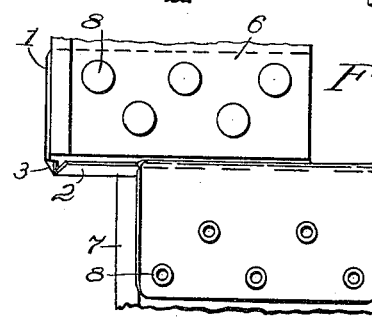

This object I have accomplished by the means which are hereinafter described and claimed, and which are illustrated in the accompanying drawings, in which:

Figure 1 is a front elevation of one of the clips of my improved belt-connection. Fig. 2 is the rear elevation of the same. Fig. 3 is an end elevation of the same. Fig. 4 is a plan view of the blank from which one of said clips is formed. Fig. 5 is a plan view of the abutting ends of a divided belt as detachably connected by means of my improved belt-connection. Fig. 6 is an edge elevation of the parts shown in said Fig. 5. Fig. 7 is a longitudinal section of the parts shown in said Fig. 5, taken on the line *a—b* thereof, and looking in the direction of the arrow. Fig. 8 is a plan view of the opposite side of the view shown in said Fig. 5, showing the clips of the belt-connection partially slidably displaced from each other. Fig. 9 is an enlarged detail edge elevation of the said belt connection, showing the parts thereof as perpendicularly displaced from one another to permit of their sidewise displacement.

Similar numerals of reference denote corresponding parts throughout the several views.

Since it is very desirable that means be provided whereby a driving belt such as is used with a gasolene engine relatively small power may be readily shifted from a driven pulley of one machine to that of another, I have provided means whereby the ends of such a belt, when divided, may be detachably connected so as to be easily and quickly manipulated for that purpose.

Referring to Figs. 5 to 9, inclusive, the numerals 6 and 7 denote the abutting ends of a divided belt furnished with my improved detachable connecting clips. Said clips 1 are of light form and dimensions and used in the reversed relation to each other as shown, being secured to opposite faces of the belt-ends 6 and 7 by means of the rivets 8 to have their abutting ends projecting past the belt ends to overlie each other. Each clip 1 has one end bent over to form a narrow spaced fold 2 which is, however, cut away at each end at 5 to provide a corner projection 3 which latter is bent over angularly as shown in Fig. 3, to partially close the end opening of the fold.

Referring now to Figs. 6 and 7, it will be seen that when the belt-ends 6 and 7 are placed in alinement, the like folds 2 of the pair of clips 1 thereon are hooked into each other. In this position of the belt ends and said clips, the end corners or projections 3 engage and lock the ends of the folds 2 from sidewise displacement relative to each other. When the belt is seated about pulleys, the belt-ends are held in this alinement with the folds 2 of the clips engaged with said projections 3 so that there can be no slidable disengagement laterally of the belt ends from each other. This is due to the tension upon the belt which keeps the folds of the clips in engagement, but any slackness in the belt will not thereby cause disengagement of the folds from each other longitudinally, since the interspace of the belt-ends is insufficient to permit of the folds becoming thus disengaged while there is no action upon the belt-ends or their said clips accompanied by a sidewise movement thereon such as would tend to move said belt-ends or clips perpendicularly apart from each other while said sidewise displacement was being effected. In other words, the belt-ends will not become disengaged in use, but may be separated from each other by manually spreading the clips away from each other perpendicularly as shown in Fig. 9, to clear the ends of the folds 2 from the corner projections 3, when the folds may be slid laterally to detach them from each other. The parts are brought into the same relations when it is sought to reëngage them.

It will be observed that each clip 1 is formed integrally from a single piece of metal by means of a die, which renders it simple and inexpensive, the rivet-holes 4 being punched to receive the rivets 8. As shown in Fig. 4, the blank is formed with notches 5 near its upper corners, so that the intermediate edge may be folded over at 2 and the said corners folded over to produce the parts 3. The connected folds 2 have enough play relative to each other to provide sufficient flexure at this place in the belt in use.

Having described my invention, what I claim as new, and desire to secure by Letters Patent, is:

1. A belt-connection, comprising like reversed clips, having on their abutting ends like hingedly connected detachable folds, each having a corner projection at the end of each fold bent over to partially close the end opening of the fold to prevent endwise sliding of the folds past each other when in one position relative to each other, but permitting such sliding movement when the clips are moved a certain distance perpendicularly apart to clear the said projections.

2. A belt-connection, comprising in combination, like reversed clips adapted to be secured on the abutting ends of a belt to project therefrom over each other from opposite sides of the belt, said clips having like hingedly connected end folds, and projections partially covering the end-openings of the folds to permit lateral displacement of the clips only when one of them is moved perpendicularly away from the other.

3. A belt-connection, comprising a pair of like clips, each having an integral hinge-part adapted to be slidably engaged with the like part on the other clip detachably, and having an integral projection at each end opening of the hinge-part thereon, to partially close it, and adapted to prevent sliding of the clips past each other only when the clips are in one position relative to each other.

Signed at Waterloo, Iowa, this 20th day of June, 1914.

THOMAS W. MORGAN.

Witnesses:
W. H. Brun,
G. C. Kennedy.

Copies of this patent may be obtained for five cents each, by addressing the "Commissioner of Patents, Washington, D. C."